UNITED STATES PATENT OFFICE.

KAICHI KASAI, OF O-MUTA, FUKUOKA KEN, JAPAN, ASSIGNOR TO MITSUI MINING CO., OF TOKYO, JAPAN.

MANUFACTURE OF PARANITROANILIN FROM PARANITROACETANILID.

1,400,555.  Specification of Letters Patent.  Patented Dec. 20, 1921.

No Drawing.  Application filed February 11, 1919. Serial No. 276,381.

*To all whom it may concern:*

Be it known that I, KAICHI KASAI, subject of the Emperor of Japan, residing at No. 40 O-muta, city of O-muta, Fukuoka Ken, Japan, have invented new and useful Improvements in the Manufacture of Paranitroanilin from Paranitroacetanilid, of which the following is a specification.

This invention relates to a process of decomposing paranitracetanilid to paranitranilin in a vessel under pressure, which is the special point of the process, by heating it together with water, or an aqueous solution containing some chemicals to neutralize acetic acid. And, in comparison with the hitherto well-known processes of the decomposition, this invention is superior in the following points:—(1) to get an improved quality in the paranitranilin produced, (2) to make it easy to be executed in practice industrially, by preventing the diffusion of the poisonous vapor of nitranilins produced during the operation of the decomposition, (3) to economize the amount of acids and alkalies to be used.

As to the decomposing process of paranitracetanilid, there has been such a process as that by heating it with some water containing a mineral acid, an alkali, or the waste acid of nitration. But the paranitranilin obtained by such a process always consists of dirty yellowish-brown crystals, and must be recrystallized, so it is accompanied with disadvantages such as (1) the diffusion of the poisonous vapor of nitranilins during this decomposition and recrystallization, (2) the requirement of an excess of acids or alkalies, (3) the decrease in the yield of paranitranilin, (4) the necessity of operations in two stages, that is, decomposition and recrystallization.

If, however, paranitracetanilid is charged into a vessel together with some water or an aqueous solution containing some chemicals (such as caustic alkalis, alkali carbonates, calcium carbonate, lime, etc.,) which shall neutralize the acetic acid produced during the decomposition of paranitracetanilid and heated for some time under a pressure of 20 to 40 pounds per square inch, then the decomposition will be complete, and beautiful yellow crystals of paranitranilin will be crystallized out of the liquid discharged from the vessel, when it is relieved from the pressure and cooled. This process is perfectly free from the above mentioned disadvantages, and therein the operation of recrystallization may be curtailed.

The process of the present invention may also be executed by using steam of high pressure instead of heating the substance with water. That is, charge paranitracetanilid into a vessel together with a small quantity of water or an aqueous solution containing the aforesaid chemicals for neutralizing the acetic acid produced during the decomposition of the substance, and keep it for some time under a pressure of 20 to 40 pounds per square inch by passing into it steam of high pressure, and then discharge the contents. Thus the decomposition may be complete, and beautiful yellow paranitranilin will be crystallized out of the liquid.

To mention a practical example executing the process according to the present invention,—350 kg. of paranitracetanilid, 80 kg. of caustic soda, and 1000 kg. of water are mixed, and this paranitracetanilid paste thus formed is charged into a vessel and kept for a period of about one hour under a pressure of 25 pounds per square inch by heating and stirring, while the temperature stands at 120–130° C. After this operation the contents are discharged, so the beautiful paranitranilin is crystallized out of the liquid, and the yield increases to 90% of the theoretical amount of the product by the depression of the temperature of the liquid.

In executing the process in practice by the steam of high pressure, exactly the same result may be obtained by decreasing the quantity of the charging water by the same quantity as the amount of the condensed water from the charging steam.

Having thus described the nature and the object of my invention, what I claim as new, and desire to secure by Letters Patent, is—

1. The process of manufacturing paranitranilin characterized by subjecting to pressure a mixture of paranitracetanilid and an aqueous alkaline solution, while heating the said mixture to a temperature between 120° and 130° C., substantially as described.

2. The process of manufacturing paranitranilin characterized by subjecting a mixture of paranitracetanilid and an aqueous alkaline solution to a pressure of not less than 20 pounds per square inch, while heating the said mixture to a temperature between 120° and 130° centigrade, substantially as described.

3. The herein described process of decomposing paranitracetanilid, which consists in mixing together paranitracetanilid, caustic soda and water in the proportions by weight of approximately twenty-five, five and seventy per cent. respectively, subjecting the mixture for a period of about one hour to a pressure in excess of twenty pounds per square inch, while simultaneously subjecting the same to a temperature between 120° and 130° C., and stirring the mixture.

In testimony whereof I have signed my name to this specification.

KAICHI KASAI.